United States Patent
Yuan et al.

(10) Patent No.: US 12,505,269 B2
(45) Date of Patent: Dec. 23, 2025

(54) PROPAGATING IMAGE CHANGES BETWEEN DIFFERENT VIEWS USING A DIFFUSION MODEL

(71) Applicant: Toyota Research Institute, Inc., Los Altos, CA (US)

(72) Inventors: Chenyang Yuan, Cambridge, MA (US); Nikos Arechiga Gonzalez, San Mateo, CA (US); Frank Permenter, Cambridge, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 173 days.

(21) Appl. No.: 18/476,866

(22) Filed: Sep. 28, 2023

(65) Prior Publication Data
US 2024/0378797 A1    Nov. 14, 2024

Related U.S. Application Data

(60) Provisional application No. 63/471,389, filed on Jun. 6, 2023, provisional application No. 63/465,613, filed on May 11, 2023.

(51) Int. Cl.
*G06F 30/27* (2020.01)
*G06F 30/15* (2020.01)
(Continued)

(52) U.S. Cl.
CPC .............. *G06F 30/27* (2020.01); *G06F 30/15* (2020.01); *G06F 30/28* (2020.01); *G06T 5/70* (2024.01);
(Continued)

(58) Field of Classification Search
CPC ....................................................... G06F 30/27
See application file for complete search history.

(56) References Cited

U.S. PATENT DOCUMENTS

| | | |
|---|---|---|
| 9,886,530 B2 | 2/2018 | Mehr et al. |
| 10,430,978 B2 | 10/2019 | Yumer et al. |
| (Continued) | | |

FOREIGN PATENT DOCUMENTS

| | | |
|---|---|---|
| WO | 2022248863 A1 | 12/2022 |
| WO | 2023004559 A1 | 2/2023 |

OTHER PUBLICATIONS

Yuan, et al. "NeRF-Editing: Geometry Editing of Neural Radiance Fields", Proceedings of the IEEE/CVF Conference on Computer Vision and Pattern Recognition, 2022, pp. 18353-18364.
(Continued)

*Primary Examiner* — Shivang I Patel
(74) *Attorney, Agent, or Firm* — Christopher G. Darrow; Darrow Mustafa PC

(57) ABSTRACT

Systems, methods, and other embodiments described herein relate to altering an image and propagating changes to other images of the same object using a diffusion model. In one embodiment, a method includes acquiring object images depicting an object. The method includes, responsive to altering one of the object images into an edited image, adapting the object images to reflect changes in the edited image by iteratively applying a diffusion model to the object images until satisfying a consistency threshold. The method includes providing the object images to represent an edited version of the object.

20 Claims, 6 Drawing Sheets

(51) Int. Cl.
| | | |
|---|---|---|
| G06F 30/28 | (2020.01) | |
| G06F 111/04 | (2020.01) | |
| G06T 5/70 | (2024.01) | |
| G06T 15/20 | (2011.01) | |
| G06T 17/00 | (2006.01) | |

(52) U.S. Cl.
CPC ............. *G06T 15/20* (2013.01); *G06T 17/00* (2013.01); *G06F 2111/04* (2020.01); *G06T 2207/20081* (2013.01); *G06T 2207/20084* (2013.01); *G06T 2210/32* (2013.01)

(56) References Cited

U.S. PATENT DOCUMENTS

| | | | |
|---|---|---|---|
| 11,450,077 B2 | 9/2022 | Munkberg et al. | |
| 2022/0189104 A1 | 6/2022 | Wetzstein et al. | |
| 2022/0319055 A1 | 10/2022 | Zhang et al. | |
| 2024/0177414 A1* | 5/2024 | Lee | G06T 17/00 |
| 2024/0307783 A1* | 9/2024 | Menapace | A63F 13/67 |
| 2024/0371081 A1* | 11/2024 | Matthews | G06T 15/20 |

OTHER PUBLICATIONS

Zheng, et al. "EditableNeRF: Editing Topologically Varying Neural Radiance Fields by Key Points", Proceedings of the IEEE/CVF Conference on Computer Vision and Pattern Recognition, 2023, pp. 8317-8327.
Tang, et al. "Make-It-3D: High-Fidelity 3D Creation from A Single Image with Diffusion Prior", arXiv preprint arXiv:2303.14184, 2023, 17 pages.
Mirzaei, et al. "Reference-guided Controllable Inpainting of Neural Radiance Fields", arXiv preprint arXiv:2304.09677, 2023, 17 pages.
Mikaeili, et al. "SKED: Sketch-guided Text-based 3D Editing", arXiv preprint arXiv:2303.10735, 2023, 15 pages.
Lin, et al. "Single-Shot Implicit Morphable Faces with Consistent Texture Parameterization", SIGGRAPH Conference Proceedings, arXiv preprint arXiv:2305.03043, Aug. 6-10, 2023, 13 pages.
Lin, et al. "CompoNeRF: Text-guided Multi-object Compositional NeRF with Editable 3D Scene Layout", arXiv preprint arXiv:2303.13843, 2023, 10 pages.
Chen, et al. "NeuralEditor: Editing Neural Radiance Fields via Manipulating Point Clouds", Proceedings of the IEEE/CVF Conference on Computer Vision and Pattern Recognition, 2023, pp. 12439-12448.
Bao, et al. "SINE: Semantic-driven Image-based NeRF Editing with Prior-guided Editing Field", Proceedings of the IEEE/CVF Conference on Computer Vision and Pattern Recognition, 2023, pp. 20919-20929.
Garcia-Garcia et al. "Pointnet: A 3d convolutional neural network for real-time object class recognition." 2016 International joint conference on neural networks (IJCNN). IEEE, 2016. Available at https://www.researchgate.net/profile/Francisco-Gomez-Donoso/publication/309776317_PointNet_A_3D_Convolutional_Neural_Network_for_real_time_object_class_recognition/links/5a2644280f7e9b71dd09fac4/PointNet-A-3D-Convolutional-Neural-Network-for-real-time-object-class-recognition.pdf.
Tatarchenko et al. "Octree generating networks: Efficient convolutional architectures for high-resolution 3d outputs." Proceedings of the IEEE international conference on computer vision. 2017 Available at https://openaccess.thecvf.com/content_ICCV_2017/papers/Tatarchenko_Octree_Generating_Networks_ICCV_2017_paper.pdf.
Li et al. "So-net: Self-organizing network for point cloud analysis." Proceedings of the IEEE conference on computer vision and pattern recognition. 2018. Available at https://openaccess.thecvf.com/content_cvpr_2018/papers/Li_SO-Net_Self-Organizing_Network_CVPR_2018_paper.pdf.
Li et al. "A Predictive and Generative Design Approach for Three-Dimensional Mesh Shapes Using Target-Embedding Variational Autoencoder." Journal of Mechanical Design 144.11 (2022): 114501. Available at https://tinyurl.com/3kjf86zx.
Wang et al. "Pixel2mesh: Generating 3d mesh models from single rgb images." Proceedings of the European conference on computer vision (ECCV). 2018. Available at https://openaccess.thecvf.com/content_ECCV_2018/papers/Nanyang_Wang_Pixel2Mesh_Generating_3D_ECCV_2018_paper.pdf.
Luo et al. "Diffusion probabilistic models for 3d point cloud generation." Proceedings of the IEEE/CVF Conference on Computer Vision and Pattern Recognition. 2021. Available at https://openaccess.thecvf.com/content/CVPR2021/papers/Luo_Diffusion_Probabilistic_Models_for_3D_Point_Cloud_Generation_CVPR_2021_paper.pdf.
Zhou et al. "3d shape generation and completion through point-voxel diffusion." Proceedings of the IEEE/CVF International Conference on Computer Vision. 2021. Available at https://openaccess.thecvf.com/content/ICCV2021/papers/Zhou_3D_Shape_Generation_and_Completion_Through_Point-Voxel_Diffusion_ICCV_2021_paper.pdf.
Zeng et al. "LION: Latent point diffusion models for 3D shape generation." arXiv preprint arXiv:2210.06978 (2022). Available at https://arxiv.org/pdf/2210.06978.pdf?trk=public_post_comment-text.
Nichol et al. "Point-E: A system for generating 3d point clouds from complex prompts." arXiv preprint arXiv:2212.08751 (2022). Available at https://arxiv.org/pdf/2212.08751.pdf?trk=organization_guest_main-feed-card_feed-article-content.
Nichol et al. "Glide: Towards photorealistic image generation and editing with text-guided diffusion models." arXiv preprint arXiv:2112.10741 (2021). Available at https://arxiv.org/pdf/2112.10741.pdf?trk=cndc-detail.
Prokhorov, "A convolutional learning system for object classification in 3-D LIDAR data." IEEE Transactions on neural networks 21.5 (2010): 858-863. Available at https://acrobat.adobe.com/link/review?uri=urn:aaid:scds:US:f3a6b42c-2961-3e00-a4e1-6ceede2a1412.
Maturana et al. "Voxnet: A 3d convolutional neural network for real-time object recognition." 2015 IEEE/RSJ international conference on intelligent robots and systems (IROS). IEEE, 2015. Available at http://graphics.stanford.edu/courses/cs233-21-spring/ReferencedPapers/voxnet_07353481.pdf.
Qi et al. "Volumetric and multi-view cnns for object classification on 3d data." Proceedings of the IEEE conference on computer vision and pattern recognition. 2016. Available at https://openaccess.thecvf.com/content_cvpr_2016/papers/Qi_Volumetric_and_Multi-View_CVPR_2016_paper.pdf.
Wang et al. "Dominant set clustering and pooling for multi-view 3d object recognition." arXiv preprint arXiv:1906.01592 (2019). Available at https://arxiv.org/pdf/1906.01592.pdf.
Masci et al. "Geodesic convolutional neural networks on riemannian manifolds." Proceedings of the IEEE international conference on computer vision workshops. 2015. Available at https://www.cv-foundation.org/openaccess/content_iccv_2015_workshops/w22/papers/Masci_Geodesic_Convolutional_Neural_ICCV_2015_paper.pdf.
Ghadai et al. "Multi-resolution 3D CNN for learning multi-scale spatial features in CAD models." Computer Aided Geometric Design 91 (2021): 102038. Available at https://par.nsf.gov/servlets/purl/10310501.
Su et al. "Multi-view convolutional neural networks for 3d shape recognition." Proceedings of the IEEE international conference on computer vision. 2015. Available at https://www.cv-foundation.org/openaccess/content_iccv_2015/papers/Su_Multi-View_Convolutional_Neural_ICCV_2015_paper.pdf.
Achlioptas et al. "Learning representations and generative models for 3d point clouds." International conference on machine learning. PMLR, 2018. Available at http://proceedings.mlr.press/v80/achlioptas18a/achlioptas18a.pdf.
Gunpinar et al. "A generative design and drag coefficient prediction system for sedan car side silhouettes based on computational fluid dynamics." Computer-Aided Design 111 (2019): 65-79. Available at https://acrobat.adobe.com/link/review?uri=urn:aaid:scds:US:3ca77e24-b39b-377e-b45a-efe63573c758.

(56) References Cited

OTHER PUBLICATIONS

Umetani et al. "Learning three-dimensional flow for interactive aerodynamic design." ACM Transactions on Graphics (TOG) 37.4 (2018): 1-10. Available at https://core.ac.uk/download/pdf/268224768.pdf.
Badias et al. An augmented reality platform for interactive aerodynamic design and analysis. No. ART-2019-116695. 2019. Available at https://sam.ensam.eu/bitstream/handle/10985/17947/PIMM_IJNME_2019_CHINESTA.pdf?sequence=3&isAllowed=y.
Wu et al. "3d shapenets: A deep representation for volumetric shapes." Proceedings of the IEEE conference on computer vision and pattern recognition. 2015. Available at https://www.cv-foundation.org/openaccess/content_cvpr_2015/papers/Wu_3D_ShapeNets_A_2015_CVPR_paper.pdf.
Wang et al. "Local spectral graph convolution for point set feature learning." Proceedings of the European conference on computer vision (ECCV). 2018. Available at https://openaccess.thecvf.com/content_ECCV_2018/papers/Chu_Wang_Local_Spectral_Graph_ECCV_2018_paper.pdf.
Boscaini et al. "Learning shape correspondence with anisotropic convolutional neural networks." Advances in neural information processing systems 29 (2016). Available at https://proceedings.neurips.cc/paper_files/paper/2016/file/228499b55310264a8ea0e27b6e7c6ab6-Paper.pdf.
Wang et al. "Voting for voting in online point cloud object detection." Robotics: science and systems. vol. 1. No. 3. 2015. Available at https://roboticsproceedings.org/rss11/p35.pdf.
Li et al. "FPNN: Field probing neural networks for 3d data." Advances in neural information processing systems 29 (2016 pp. 307-315. Available at https://proceedings.neurips.cc/paper_files/paper/2016/file/854d6fae5ee42911677c739ee1734486-Paper.pdf.
Fey et al. "SplineCNN: Fast geometric deep learning with continuous b-spline kernels." Proceedings of the IEEE conference on computer vision and pattern recognition. 2018. Available at https://proceedings.neurips.cc/paper_files/paper/2016/file/854d6fae5ee42911677c739ee1734486-Paper.pdf.
Michel et al. "Text2mesh: Text-driven neural stylization for meshes." Proceedings of the IEEE/CVF Conference on Computer Vision and Pattern Recognition. 2022. Available at https://openaccess.thecvf.com/content/CVPR2022/papers/Michel_Text2Mesh_Text-Driven_Neural_Stylization_for_Meshes_CVPR_2022_paper.pdf.
Jetchev, "Clipmatrix: Text-controlled creation of 3d textured meshes." arXiv preprint arXiv:2109.12922 (2021). Available at https://arxiv.org/pdf/2109.12922.pdf.
Maron et al. "Convolutional neural networks on surfaces via seamless toric covers." ACM Trans. Graph. 36.4 (2017): 71-1. Available at http://www.vovakim.com/papers_small/17_SIGGRAPH_ToricCNN.pdf.
Ben-Hamu et al. "Multi-chart generative surface modeling." ACM Transactions on Graphics (TOG) 37.6 (2018): 1-15. Available at https://arxiv.org/pdf/1806.02143.pdf.
Saquil et al. "Rank3DGAN: Semantic mesh generation using relative attributes." Proceedings of the AAAI Conference on Artificial Intelligence. vol. 34. No. 04. 2020. Available at https://doi.org/10.1609/aaai.v34i04.6011.
Alhaija et al. "XDGAN: Multi-Modal 3D Shape Generation in 2D Space." arXiv preprint arXiv:2210.03007 (2022). Available at https://arxiv.org/pdf/2210.03007.pdf.
Chen et al. "Learning implicit fields for generative shape modeling." Proceedings of the IEEE/CVF Conference on Computer Vision and Pattern Recognition. 2019. Available at https://openaccess.thecvf.com/content_CVPR_2019/papers/Chen_Learning_Implicit_Fields_for_Generative_Shape_Modeling_CVPR_2019_paper.pdf.
Park et al. "Deepsdf: Learning continuous signed distance functions for shape representation." Proceedings of the IEEE/CVF conference on computer vision and pattern recognition. 2019. Available at https://openaccess.thecvf.com/content_CVPR_2019/papers/Park_DeepSDF_Learning_Continuous_Signed_Distance_Functions_for_Shape_Representation_CVPR_2019_paper.pdf.
Alwala et al. "Pre-train, self-train, distill: A simple recipe for supersizing 3d reconstruction." Proceedings of the IEEE/CVF Conference on Computer Vision and Pattern Recognition. 2022. Available at https://openaccess.thecvf.com/content/CVPR2022/papers/Alwala_Pre-Train_Self-Train_Distill_A_Simple_Recipe_for_Supersizing_3D_Reconstruction_CVPR_2022_paper.pdf.
Liu et al. "ISS: Image as stetting stone for text-guided 3d shape generation." arXiv preprint arXiv:2209.04145 (2022) Available at https://arxiv.org/pdf/2209.04145.pdf.
De Avila Belbute-Peres et al., "Combining differentiable PDE solvers and graph neural networks for fluid flow prediction." international conference on machine learning. PMLR, 2020. Available at http://proceedings.mlr.press/v119/de-avila-belbute-peres20a/de-avila-belbute-peres20a.pdf.
Rosset et al. "Interactive design of 2D car profiles with aerodynamic feedback." Computer Graphics Forum. vol. 42. No. 2. 2023. Available at https://inria.hal.science/hal-03975369/document.
Remelli et al. "MeshSDF: Differentiable iso-surface extraction." Advances in Neural Information Processing Systems 33 (2020): 22468-22478. Available at https://proceedings.neurips.cc/paper/2020/file/fe40fb944ee700392ed51bfe84dd4e3d-Paper.pdf.
Baque et al. "Geodesic convolutional shape optimization." International Conference on Machine Learning. PMLR, 2018 Available at http://proceedings.mlr.press/v80/baque18a/baque18a.pdf.
Jacob et al. "Deep learning for real-time aerodynamic evaluations of arbitrary vehicle shapes." arXiv preprint arXiv:2108.05798 (2021). Available at https://arxiv.org/ftp/arxiv/papers/2108/2108.05798.pdf.
Durasov et al."Debosh: Deep bayesian shape optimization." arXiv preprint arXiv:2109.13337 (2021). Available at https://arxiv.org/pdf/2109.13337.pdf.
Thuerey et al. "Deep learning methods for Reynolds-averaged Navier-Stokes simulations of airfoil flows." AIAA Journal 58.1 (2020): 25-36 Available at https://arxiv.org/pdf/1810.08217.pdf.
Saha et al. "Exploiting generative models for performance predictions of 3D car designs." 2021 IEEE Symposium Series on Computational Intelligence (SSCI). IEEE, 2021. Available at https://research.birmingham.ac.uk/files/151973291/paper_final.pdf.
Xin et al. "Surrogate drag model of non-spherical fragments based on artificial neural networks." Powder Technology 404 (2022): 117412. Available at https://acrobat.adobe.com/link/review?uri=urn:aaid:scds:US:1f737ce4-b67d-3923-b0e6-21628c75af6a.
Tao et al. "Application of a PCA-DBN-based surrogate model to robust aerodynamic design optimization." Chinese Journal of Aeronautics 33.6 (2020): 1573-1588. Available at https://www.sciencedirect.com/science/article/pii/S1000936120300984.
Sun et al. "A review of the artificial neural network surrogate modeling in aerodynamic design." Proceedings of the Institution of Mechanical Engineers, Part G: Journal of Aerospace Engineering 233.16 (2019): 5863-5872. Available at https://tinyurl.com/yu93u8px.
Chang et al. "Shapenet: An information-rich 3d model repository." arXiv preprint arXiv:1512.03012 (2015). Available at https://arxiv.org/pdf/1512.03012.pdf.
Biswas et al. "Development and Prediction of Vehicle Drag Coefficient Using OpenFoam CFD Tool". No. 2019-26-0235. SAE Technical Paper, 2019. Available at https://acrobat.adobe.com/link/review?uri=urn:aaid:scds:US:c1077397-7ac4-38f4-a2e6-2743e454d776.
Szegedy et al. "Rethinking the inception architecture for computer vision." Proceedings of the IEEE conference on computer vision and pattern recognition. 2016. Available at https://www.cv-foundation.org/openaccess/content_cvpr_2016/papers/Szegedy_Rethinking_the_Inception_CVPR_2016_paper.pdf.
He et al. "Deep residual learning for image recognition." Proceedings of the IEEE conference on computer vision and pattern recognition. 2016. Available at https://openaccess.thecvf.com/content_cvpr_2016/papers/He_Deep_Residual_Learning_CVPR_2016_paper.pdf.
Xie et al. "Aggregated residual transformations for deep neural networks." Proceedings of the IEEE conference on computer vision and pattern recognition. 2017. Available at https://openaccess.thecvf.

(56) References Cited

OTHER PUBLICATIONS com/content_cvpr_2017/papers/Xie_Aggregated_Residual_Transformations_CVPR_2017_paper.pdf.

Dosovitskiy et al. "An image is worth 16x16 words: Transformers for image recognition at scale." arXiv preprint arXiv:2010.11929 (2020). Available at https://arxiv.org/pdf/2010.11929.pdf fbclid=IWAR1NafJDhZjkARvCswpV6KS9_hMa0ycvzwhICb7cqAGwgzComFXcScxgA8o.

Du et al. "Improving multi-modal learning with uni-modal teachers." arXiv preprint arXiv:2106.11059 (2021). Available at https://arxiv.org/pdf/2106.11059.pdf.

Song et al. "Attention-Enhanced Multimodal Learning for Conceptual Design Evaluations." Journal of Mechanical Design 145.4 (2023): 041410. Available at https://acrobat.adobe.com/link/review?uri=urn:aaid:scds:US:c4093a59-7902-3901-b74d-7711622dc236.

Rios et al. "On the efficiency of a point cloud autoencoder as a geometric representation for shape optimization." 2019 IEEE Symposium Series on Computational Intelligence (SSCI). IEEE, 2019. Available at https://www.honda-ri.de/pubs/pdf/4199.pdf.

Klokov et al. "Escape from cells: Deep kd-networks for the recognition of 3d point cloud models." Proceedings of the IEEE international conference on computer vision. 2017. Available at https://openaccess.thecvf.com/content_ICCV_2017/papers/Klokov_Escape_From_Cells_ICCV_2017_paper.pdf.

Qi et al. "PointNet: Deep learning on point sets for 3d classification and segmentation." Proceedings of the IEEE conference on computer vision and pattern recognition. 2017. Available at https://openaccess.thecvf.com/content_cvpr_2017/papers/Qi_PointNet_Deep_Learning_CVPR_2017_paper.pdf.

Kanezaki et al. "Rotationnet: Joint object categorization and pose estimation using multiviews from unsupervised viewpoints." Proceedings of the IEEE conference on computer vision and pattern recognition. 2018. Available at https://openaccess.thecvf.com/content_cvpr_2018/papers/Kanezaki_RotationNet_Joint_Object_CVPR_2018_paper.pdf.

Abbas et al. "Geometrical deep learning for performance prediction of high-speed craft." Ocean Engineering 258 (2022): 111716. Available at https://acrobat.adobe.com/link/review?uri=urn:aaid:scds:US:ea8d6016-4578-356e-8479-9071a7a70575.

Allen et al. "Physical design using differentiable learned simulators." arXiv preprint arXiv:2202.00728 (2022). Available at https://arxiv.org/pdf/2202.00728.pdf.

Chung et al. "Diffusion posterior sampling for general noisy inverse problems." arXiv preprint arXiv:2209.14687 (2022). Available at https://arxiv.org/pdf/2209.14687.pdf.

Chung et al. "Improving diffusion models for inverse problems using manifold constraints." Advances in Neural Information Processing Systems 35 (2022): 25683-25696. Available at https://proceedings.neurips.cc/paper_files/paper/2022/file/a48e5877c7bf86a513950ab23b360498-Paper-Conference.pdf.

Crowson "Clip Guided Diffusion HQ 256x256.ipynb—Colaboratory" Retrieved from the Internet: <https://colab.research.google.com/drive/12a_Wrfi2_gwwAuN3VvMTwVMz9TfqctNj>, retrieved Oct. 4, 2023 (4 pages).

Dhariwal et al. "Diffusion models beat gans on image synthesis." Advances in neural information processing systems 34 (2021): 8780-8794. Available at https://proceedings.neurips.cc/paper_files/paper/2021/file/49ad23d1ec9fa4bd8d77d02681df5cfa-Paper.pdf.

Giannone et al. "Diffusing the optimal topology: A generative optimization approach." arXiv preprint arXiv:2303.09760 (2023). Available at https://arxiv.org/pdf/2303.09760.pdf.

Ho et al. "Classifier-free diffusion guidance." arXiv preprint arXiv:2207.12598 (2022). Available at https://arxiv.org/pdf/2207.12598.pdf.

Liu et al. "Zero-1-to-3: Zero-shot one image to 3d object." Proceedings of the IEEE/CVF International Conference on Computer Vision. 2023. Available at https://openaccess.thecvf.com/content/ICCV2023/papers/Liu_Zero-1-to-3_Zero-shot_One_Image_to_3D_Object_ICCV_2023_paper.pdf.

Maze et al. "Topodiff: A performance and constraint-guided diffusion model for topology optimization." arXiv preprint arXiv:2208.09591 (2022). Available at https://arxiv.org/pdf/2208.09591.pdf.

Permenter et al. "Interpreting and Improving Diffusion Models Using the Euclidean Distance Function." arXiv preprint arXiv:2306.04848 (2023). Available at https://arxiv.org/pdf/2306.04848.pdf.

Poole et al. "Dreamfusion: Text-to-3d using 2d diffusion." arXiv preprint arXiv:2209.14988 (2022). Available at https://arxiv.org/pdf/2209.14988.pdf.

Radford et al. "Learning transferable visual models from natural language supervision." International conference on machine learning. PMLR, 2021. Available at http://proceedings.mlr.press/v139/radford21a/radford21a.pdf.

Rahimi et al. "Random features for large-scale kernel machines." Advances in neural information processing systems 20 (2007). Available at https://proceedings.neurips.cc/paper/2007/file/013a006f03dbc5392effeb8f18fda755-Paper.pdf.

Ramesh et al. "Hierarchical text-conditional image generation with clip latents." arXiv preprint arXiv:2204.06125 1.2 (2022): 3. Available at https://3dvar.com/Ramesh2022Hierarchical.pdf.

Rombach et al. "High-resolution image synthesis with latent diffusion models." Proceedings of the IEEE/CVF conference on computer vision and pattern recognition. 2022. Available at https://openaccess.thecvf.com/content/CVPR2022/papers/Rombach_High-Resolution_Image_Synthesis_With_Latent_Diffusion_Models_CVPR_2022_paper.pdf.

Saharia et al. "Photorealistic text-to-image diffusion models with deep language understanding." Advances in Neural Information Processing Systems 35 (2022): 36479-36494. Available at https://proceedings.neurips.cc/paper_files/paper/2022/file/ec795aeadae0b7d230fa35cbaf04c041-Paper-Conference.pdf.

Song et al. "Surrogate Modeling of Car Drag Coefficient with Depth and Normal Renderings." arXiv preprint arXiv:2306.06110 (2023). Available at https://browse.arxiv.org/pdf/2306.06110.pdf.

Song et al."Denoising diffusion implicit models." arXiv preprint arXiv:2010.02502 (2020). Available at https://browse.arxiv.org/pdf/2010.02502.pdf?trk=cndc-detail.

Bansal et al. "Universal guidance for diffusion models." Proceedings of the IEEE/CVF Conference on Computer Vision and Pattern Recognition. 2023. Available at https://acrobat.adobe.com/link/review?uri=urn:aaid:scds:US:e14b8671-27d5-3fcf-9c96-66f8d4205197.

* cited by examiner

PROPAGATING IMAGE CHANGES BETWEEN DIFFERENT VIEWS USING A DIFFUSION MODEL

CROSS-REFERENCE TO RELATED APPLICATIONS

This application claims the benefit of U.S. Provisional Application No. 63/465,613, filed on, May 11, 2023 and U.S. Provisional Application 63/471,389 filed on Jun. 6, 2023, which are herein incorporated by reference in their entirety.

TECHNICAL FIELD

The subject matter described herein relates, in general, to representing objects and, more particularly, to using a diffusion model to propagate changes between different two-dimensional views of an object.

BACKGROUND

Editing objects in digital environments, such as computer-aided design (CAD), can be a tedious task. For example, CAD-based tools may represent objects as sets of parameters and routines for building a model from the parameters. Thus, manipulating a three-dimensional (3D) model of an object in this environment may involve identifying appropriate parameters and then modifying the parameters to achieve a desired alteration. However, this process can be tedious and not always accurate as some models are represented by a plurality of parameters, which may be difficult to identify and accurately adjust. Moreover, editing individual views of an object from a two-dimensional (2D) image also has difficulties in that each separate image must be individually altered, thereby causing difficulties with accurately extrapolating changes.

SUMMARY

In one embodiment, example systems and methods relate to a manner of improving the altering of 2D images by using a diffusion model to propagate changes between different views of an object.

In one embodiment, a modeling system is disclosed. The modeling system includes one or more processors and a memory communicably coupled to the one or more processors. The memory stores instructions that, when executed by the one or more processors, cause the one or more processors to acquire object images depicting an object. The instructions include instructions to responsive to altering one of the object images into an edited image, adapt the object images to reflect changes in the edited image by iteratively applying a diffusion model to the object images until satisfying a consistency threshold. The instructions include instructions to provide the object images to represent an edited version of the object.

In one embodiment, a non-transitory computer-readable medium including instructions that, when executed by one or more processors, cause the one or more processors to perform one or more functions is disclosed. The instructions include instructions acquire object images depicting an object. The instructions include instructions to, responsive to altering one of the object images into an edited image, adapt the object images to reflect changes in the edited image by iteratively applying a diffusion model to the object images until satisfying a consistency threshold. The instructions include instructions to provide the object images to represent an edited version of the object.

In one embodiment, a method is disclosed. In one embodiment, the method includes acquiring object images depicting an object. The method includes, responsive to altering one of the object images into an edited image, adapting the object images to reflect changes in the edited image by iteratively applying a diffusion model to the object images until satisfying a consistency threshold. The method includes providing the object images to represent an edited version of the object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
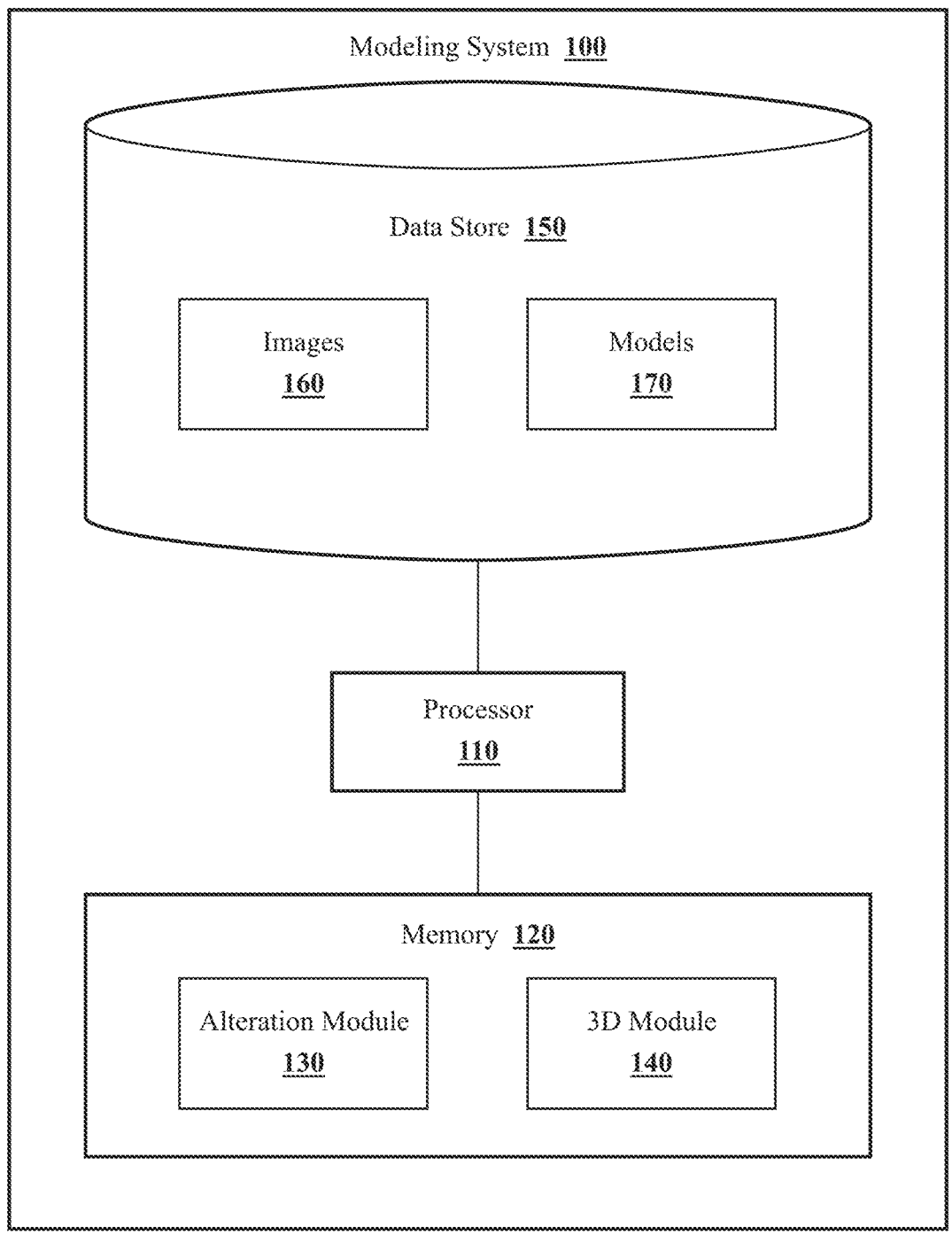
FIG. 1 illustrates one embodiment of a modeling system that is associated with improving the altering of 2D images by using a diffusion model to propagate changes between different views of an object.

Systems, methods, and other embodiments associated with altering an image and propagating changes to other images of the same object using a diffusion model are disclosed herein. As previously described, editing the representation of an object, whether in a 2D format or a 3D format, presents various difficulties. That is, in the context of a CAD model, identifying specific parameters and accurately adapting the parameters can be difficult. Moreover, as previously outlined, propagating changes to from one image of an object to another image of the same object is generally not feasible as the images are distinct representations with no explicit association. As such, attempts to propagate changes between images often suffers from difficulties with accuracy.

Therefore, in one or more approaches, an inventive system implements a diffusion model that functions to propagate changes between images of the same object. For example, in one approach, the system initially trains a diffusion model. Training the diffusion model may involve initially adding Gaussian noise to a set of images of the same object with the separate images representing different viewpoints of the object. Thereafter, the system executes the diffusion model iteratively over the set of images. At each iteration, the system enforces consistency between the images in a pairwise manner by deriving a consistency loss value between the images. This loss value is used to train the diffusion model. Ultimately, the diffusion model outputs an updated form of the images without the noise.

Thereafter, the system uses the diffusion model to propagate changes between images of an object. In one approach, a three-dimensional object is represented using a number of two-dimensional images that separately show the object from different viewpoints. That is, the images of the object may be isometric projections, perspective views, orthographic views, or another 2D representation of a 3D object. The separate views themselves may be randomly provided or can be systematically provided according to a defined set of viewpoints. Moreover, the number of images may vary but generally includes at least three separate images to capture a comprehensive representation of the object.

In any case, the system acquires at least one edited image from the original images of the object. The edited image may be generated by a neural network when, for example, optimizing some aspect of the object, such as drag in relation to a vehicle. Thus, the shape of the represented object is altered in the edited image. In further forms, an image may be edited via image-editing software. Whichever approach operates to alter the edited image, the object in the edited image varies from the original object as represented in the other images. Thus, the system can then apply the diffusion model to the images, including the edited images, to propagate the changes across the set of images of the object. The diffusion model functions to enforce consistency between the images and the system executes the diffusion model in an iterative manner such that the diffusion model incrementally alters the images until the changes in the edited image are represented across all of the images. In this way, the disclosed system improves propagating changes to between images of the same object.

With reference to FIG. 1, one embodiment of a modeling system 100 is illustrated. In various embodiments, the modeling system 100 is implemented as a cloud-based service, within a local computer, within a mobile system (e.g., within a vehicle), or within another computing platform. For example, in one approach, functionality associated with at least one module of the modeling system 100 is implemented within a local computing device, while further functionality is implemented within a cloud-based computing system. Thus, the modeling system 100 may include a local instance and a remote instance that functions within the cloud-based environment. In further implementations, the modeling system 100 is contained within a single device as opposed to being distributed.

Moreover, the modeling system 100, as provided for herein, may function in cooperation with one or more additional systems, such as a communication system, a display system, a rendering system, a simulation system, and so on. Accordingly, the modeling system 100, in one or more embodiments, functions in combination with other systems to generate outputs that realize advantages of the disclosed systems and methods, such as improved display of edited graphics representing objects, improved representations in simulations that improve the efficiency of the simulations, improved display within a vehicle, such as within an augmented reality environment, and so on.

The modeling system 100 is shown as including a processor 110. Accordingly, the processor 110 may be a part of the modeling system 100, or the modeling system 100 may access the processor 110 through a data bus or another communication path that is separate from the system 100. In one embodiment, the modeling system 100 includes a memory 120 that stores an alteration module 130 and a 3D module 140. The memory 120 is a random-access memory (RAM), read-only memory (ROM), a hard-disk drive, a flash memory, or another memory that stores the modules 130 and 140. The modules 130 and 140 are, for example, computer-readable instructions that, when executed by the processor 110, cause the processor 110 to perform the various functions disclosed herein. In alternative arrangements, the modules 130 and 140 are independent elements from the memory 120 that are, for example, comprised of hardware elements. Thus, the modules 130 and 140 are alternatively ASICs, hardware-based controllers, a composition of logic gates, or another hardware-based solution. As noted previously, the modeling system 100 as illustrated in FIG. 1 is generally an abstracted form of the modeling system 100 as may be distributed between various locations within a cloud-computing environment. In one or more approaches, the cloud environment may facilitate communications between multiple different devices to acquire and distribute information for processing and representation by the system 100.

Moreover, in one embodiment, the modeling system 100 includes the data store 150. The data store 150 is, in one embodiment, an electronic data structure stored in the memory 120 or another data storage device and that is configured with routines that can be executed by the processor 110 for analyzing stored data, providing stored data, organizing stored data, and so on. Thus, in one embodiment, the data store 150 stores data used by the modules 130 and 140 in executing various functions. In one embodiment, the data store 150 stores the images 160, one or more models 170 along with, for example, other data used by the modeling system 100.

Accordingly, in at least one configuration, the modeling system 100 implements various data structures and routines to propagate changes from one image of an object into additional images representing the same object from different viewpoints. The following discussion first provides a general overview of aspects of the modeling system 100, including a discussion of training of the diffusion model and then details implementation of the diffusion model to propagate changes between images.

Figure 2A:
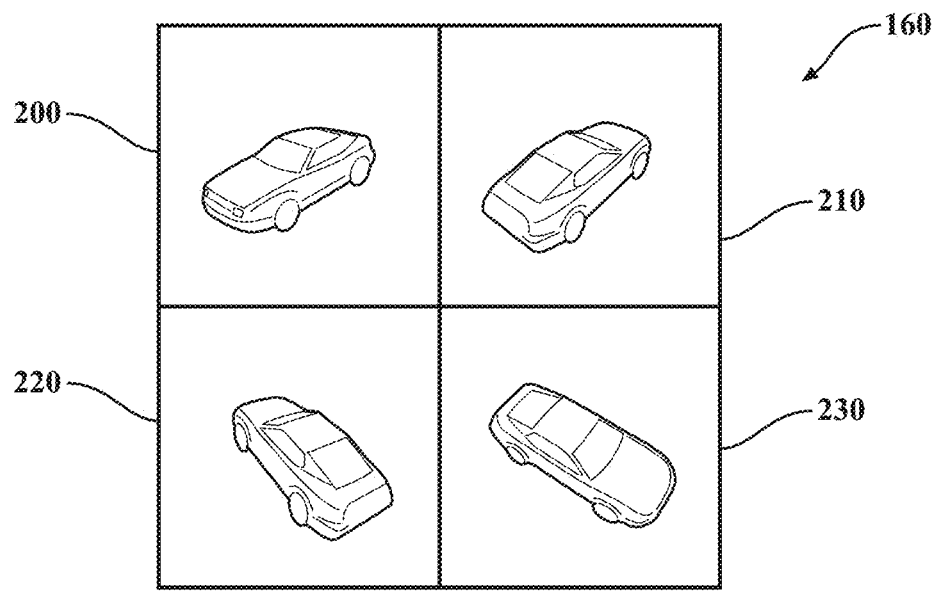
FIG. 2A illustrates one example of separate 2D images of an object from multiple viewpoints.

With reference to FIG. 2A, one example of object images 160 are shown. The object images 160 include four separate images 200, 210, 220, and 230. It should be appreciated that while four separate images 200, 210, 220, and 230 are shown for the object, in other embodiments, the number of images for a given object may vary. For example, the object images 160 for a given object generally include a sufficient number of images to provide a comprehensive representation of the object. In one arrangement, the images 160 may include two or more images for any given object. However, in further arrangements, the object images 160 for a given object will include at least four images. The separate images of the object are generally from different viewpoints, such as top, front, right, left, and other oblique/angled views. Overall, the images 160 are acquired in order to provide multiple different views of the object, either overall, or in relation to a particular salient element of the object. Moreover, the form of the object images 160 is generally a 2D image having a defined electronic format (e.g., JPEG, PNG, GIF, TIFF, PSD, PDF, etc.). Accordingly, the object images 160 are generally described as 2D images representing a 3D object.

Figure 2B:
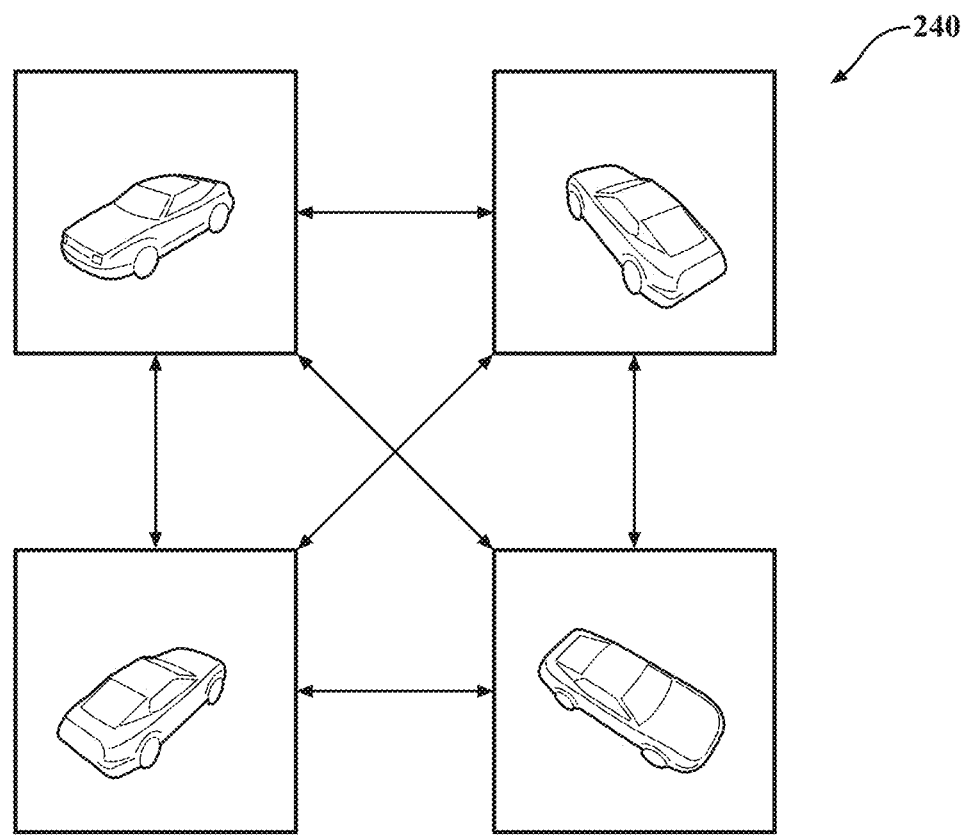
FIG. 2B illustrates one example of mapping consistency between separate ones of the 2D images from FIG. 2A.

Continuing to FIG. 2B, an example of learned consistency maps 240 between the images 160 is illustrated. That is, as described in further detail subsequently, the modeling system 100 enforces consistency between each pair of images as shown through the relationships illustrated by the arrows in FIG. 2B. One example of the training process for the diffusion model will be described in relation to FIG. 3 for which the consistency maps 240 are relevant. Before further discussing the training process, reference is first made to the models 170 stored by the modeling system 100. The models include, in at least one configuration, the diffusion model and any further models implemented by the modeling system 100. For example, the modeling system 100 may implement one or more additional models that provide changes to the object images 160, such as a generative model for adapting a form of an object according to drag or another characteristic. The diffusion model is, in at least one approach, a generative model that is trained by adding progressively larger amounts of Gaussian noise to a given training data set, thereby mimicking a diffusion process. In general, the diffusion model performs a process of sampling that reverses the noise through denoising.

Figure 3:
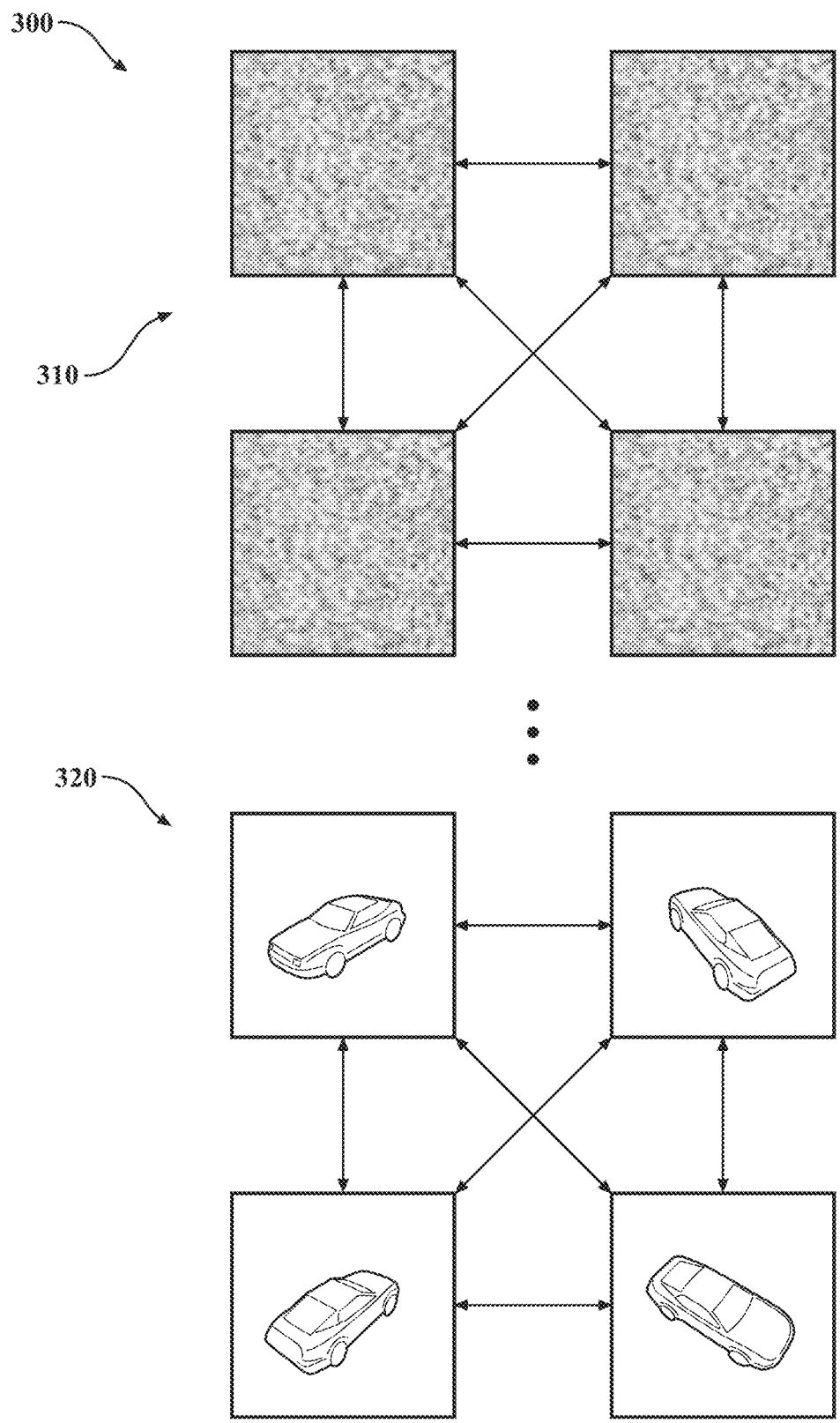
FIG. 3 illustrates one example of a training process in which Gaussian noise is introduced to the separate images.

Accordingly, FIG. 3 illustrates one example 300 of training the diffusion model. That is, images 310 represent an initial input to the diffusion model for training, while images 320 represent a final iteration (e.g., iteration 100) over the images. In general, the diffusion model estimates a noise vector $\epsilon \in \mathbb{R}^n$ from a given $y \in \mathbb{R}^n$ and a noise level $\sigma > 0$ such that $y = x + \sigma \epsilon$ approximately holds for some $x$ in the training set. The learned estimator, denoted $\epsilon_\theta: \mathbb{R}^n \times \mathbb{R}_+ \to \mathbb{R}^n$, is called a denoiser. The trainable parameters, denoted jointly by $\theta \in \mathbb{R}^m$, are found by (approximately) minimizing the following equation.

$$L(\theta) := \sum_{x,\sigma,\epsilon} \|\epsilon_\theta(x + \sigma\epsilon, \sigma) - \epsilon\|^2 \qquad (1)$$

When $x$ is drawn from the training-set distribution, $\sigma$ is drawn uniformly from a finite set of positive numbers, and $\epsilon$ is drawn from a Gaussian distribution $N(0, I)$. In various approaches, the particular form of the training process may vary, such as by implementing latent diffusion, i.e., the variable $x$ is not an element of pixel space, but rather an element of a lower-dimensional latent space defined by a variational autoencoder (VAE). In any case, the modeling system 100 can function to iteratively minimize equation (1) in order to train the diffusion model over multiple iterations, as shown in FIG. 3.

Moreover, let $\{\sigma_t\}_{t=0}^N$ denote the set of noise levels $\sigma$ used in training and assume that $\sigma_t > \sigma_{t-1}$. The sequence $\sigma_t$ is sued by sampling algorithms to construct novel images using a trained denoiser $\epsilon_\theta$. In one approach, the diffusion model is the DDIM sampler, which, given $x_T \sim N(0, \sigma_T^2 I)$, generates an image $x_0$ via the following recursive equation.

$$x_{t-1} = x_t - (\sigma_t - \sigma_{t-1})\epsilon_\theta(x_t, t) \qquad (2)$$

In one or more approaches, the iterations can be interpreted as approximate gradient descent on the Euclidean distance function of the training set, thereby leveraging an approximate correspondence between denoising and orthogonal projection. In one example, classifier-free text guidance executes this recursion using a modified denoiser $\epsilon_\theta(x_t, t, y)$ that takes a reference CLIP embedding y as an optional third input. The system constructs $\epsilon_\theta(x_t, t)$ via the following equation.

$$\epsilon_\theta(x_t, t) = (1 - w)\epsilon_\theta(x_t, t, \emptyset) + w(\epsilon_\theta(x_t, t, y)) \qquad (3)$$

where w is a weighting factor and $\emptyset$ denotes the empty string.

Figure 4:
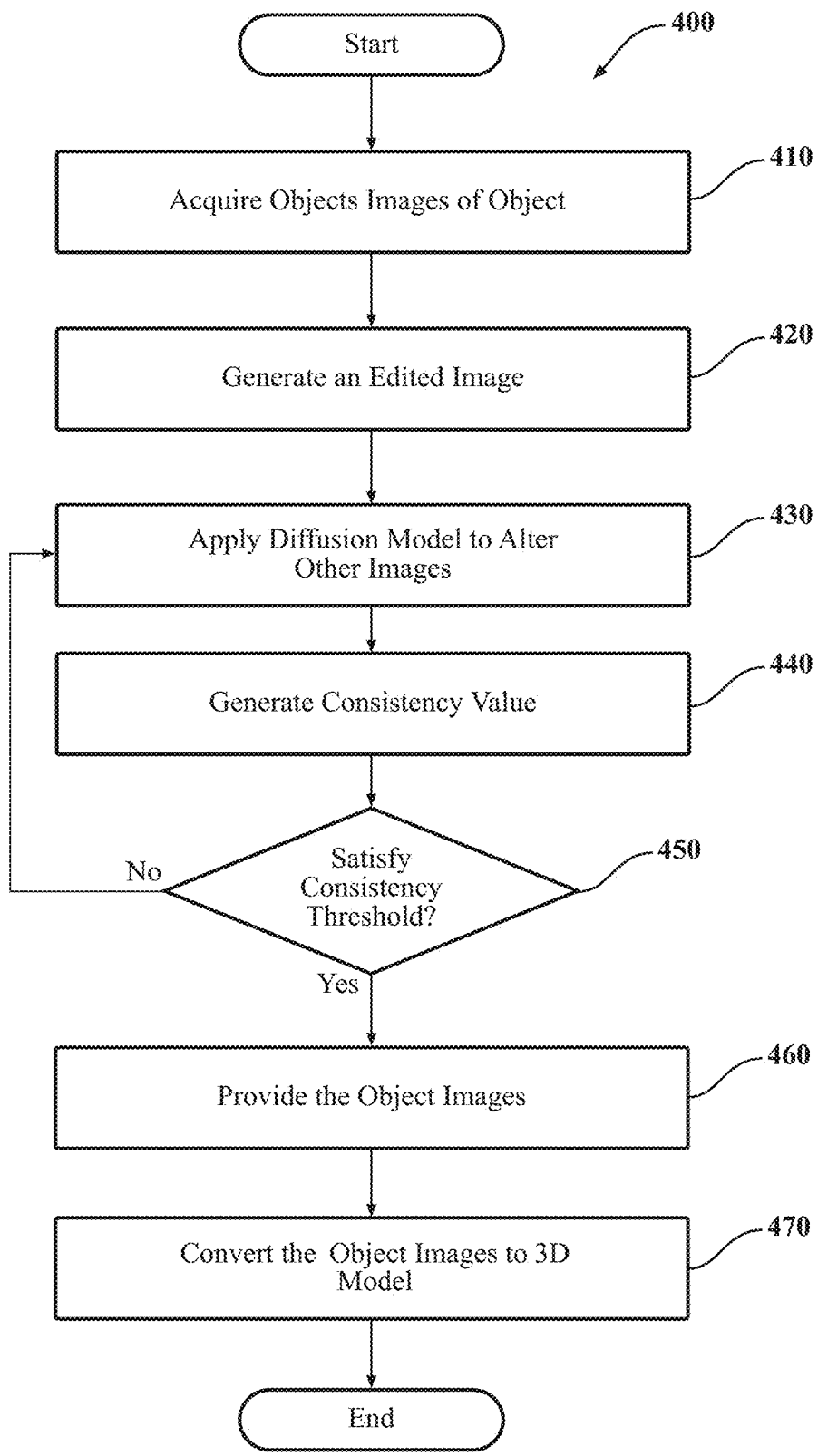
FIG. 4 illustrates a flowchart for one embodiment of a method that is associated with altering an image and propagating changes to other images of the same object using a diffusion model.

FIG. 4 illustrates a flowchart of a method 400 that is associated with altering an image and propagating changes to other images of the same object using a diffusion model. Method 400 will be discussed from the perspective of the modeling system 100. While method 400 is discussed in combination with the modeling system 100, it should be appreciated that the method 400 is not limited to being implemented within the modeling system 100 but is instead one example of a system that may implement the method 400.

At 410, the alteration module 130 acquires object images 160 depicting an object. As previously described, the object images 160 depict different viewpoints of the object. That is, the object images depict different viewing angles of the object, which may be different side views and/or different elevations. In general, the object images 160 for a respective object depict aspects that are relevant to a particular task. For example, if a particular body panel of a vehicle is being modified for a design, then the object images 160 show different perspectives of the body panel and/or the whole vehicle. In further aspects, the object images 160 may be comprehensive in relation to depicting all aspects of an object. The particular selection of the object images 160 for an object is dependent on what is provided, which generally relates to the task being undertaken. As such, the arrangement of the object images 160 may vary between different occurrences. Moreover, the alteration module 130 acquires the object images 160 from an electronic source, such as an image generation system that may derive the images 160 from another routine, such as a modeling program, a photograph acquisition/editing system, or another source.

At 420, the alteration module 130 alters one of the object images 160 into an edited image. That is, as previously set forth, the object images 160 include multiple different images of the same object that are generally provided from different viewing angles of the object. Thus, at 420, the alteration module 130 alters at least one of the object images 160 of the object. It should be appreciated that while the present discussion focuses on active alteration of the object images 160, in one or more implementations, the alteration module 130 receives the object images 160 with at least one image already altered. In any case, the alteration module 130 may alter a form of the object as depicted in one of the images. In one embodiment, the alteration module 130 alters the image using image editing routines that, for example, function according to a script and/or manual electronic inputs from a user to change characteristics of the edited image, such as a geometry or other aspect of the object.

In further aspects, the alteration module 130 modifies the edited image(s) using one or more models from the models 170, such as a generative model. The generative model is, for example, a neural network, such as an autoencoder or other generative network that functions to accept one or more of the object images 160 as an input and alter a depiction of the object provided therein according to a trained function. The trained function may be related to a design/engineering task (e.g., improving drag of a vehicle), an artistic transformation, or another trained function. In any case, the alteration module 130 generates or at least acquires the edited image(s) that have some aspect of the depicted object that is different from the other object images 160.

At 430, the alteration module 130 applies the diffusion model to the object images 160 to propagate changes in the edited image. Because the changes to the edited image do not automatically propagate to the other object images 160 and the object images 160 do not have explicitly defined relationships with which to propagate such changes, extrapolating the changes to the other object images 160 is not accomplished easily. Thus, the alteration module 130 applies the diffusion model to propagate the changes from the edited image to other images of the object images 160. That is, the diffusion model functions to enforce consistency between the object images 160, thereby adapting the images that do not presently include the edited aspects.

At 440, the alteration module 130 computes a consistency value. To compute the consistency value, the alteration module 130 applies a loss function, which may be the same loss function as used to train the diffusion model, between the separate object images. As previously shown in FIG. 2B, the modeling system 100 compares each image through a consistency mapping to derive the consistency value. In general, the consistency value assesses a similarity between the representations of the object in the separate images. Thus, when the edited image is compared against the other images via the loss function, the alteration module 130 can identify the inconsistency in the edited image.

At 450, the alteration module 130 determines whether the consistency value satisfies a consistency threshold. The consistency threshold defines an extent of difference between the edited image and the other images that is acceptable. That is, the alteration module 130 iteratively applies the diffusion model to the object images 160, including the edited image to propagate the changes to the other images. However, the changes are incremental at each iteration. Thus, as shown in method 400, the alteration module 130 iterates over the functions described at blocks 430-450 to adapt, assess, check, and repeat when the consistency value does not satisfy the consistency threshold. Thus, while the change is not fully propagated and thus the images are determined to not be consistent up to the defined consistency threshold, the alteration module 130 proceeds to repeat applying the diffusion model. Accordingly, the consistency threshold functions to enforce consistency among the object images 160.

At 460, the alteration module 130 provides the object images 160 as adapted by the diffusion model to represent an edited version of the object. Depending on the particular implementation, the alteration module 130 may function to provide the object images 160 at block 460 in different ways. In general, the alteration module 130 electronically communicates the adapted form of the object images 160 to another system so that the object images 160 can be used to represent the adapted object. By way of example, the alteration module 130 may communicate the object images 160 to a cloud-based entity for use within a design/engineering environment. As another example, the alteration module 130 may electronically display the object images 160. Whichever approach is undertaken, the diffusion model functions to adapt the images by propagating the changes through visual changes in the images and without explicit electronic relationships between the separate image files as may be applied in CAD-based systems.

At 470, the 3D module 140 converts the object images 160 into a three-dimensional model. For example, the 3D module 140 may use the information about the object depicted in the object images 160 to generate a 3D representation of the object. In one approach, the 3D representation is a neural radiance field (NeRF) or other 3D representation that the modeling system 100 uses to render and display the object.

Figure 5:
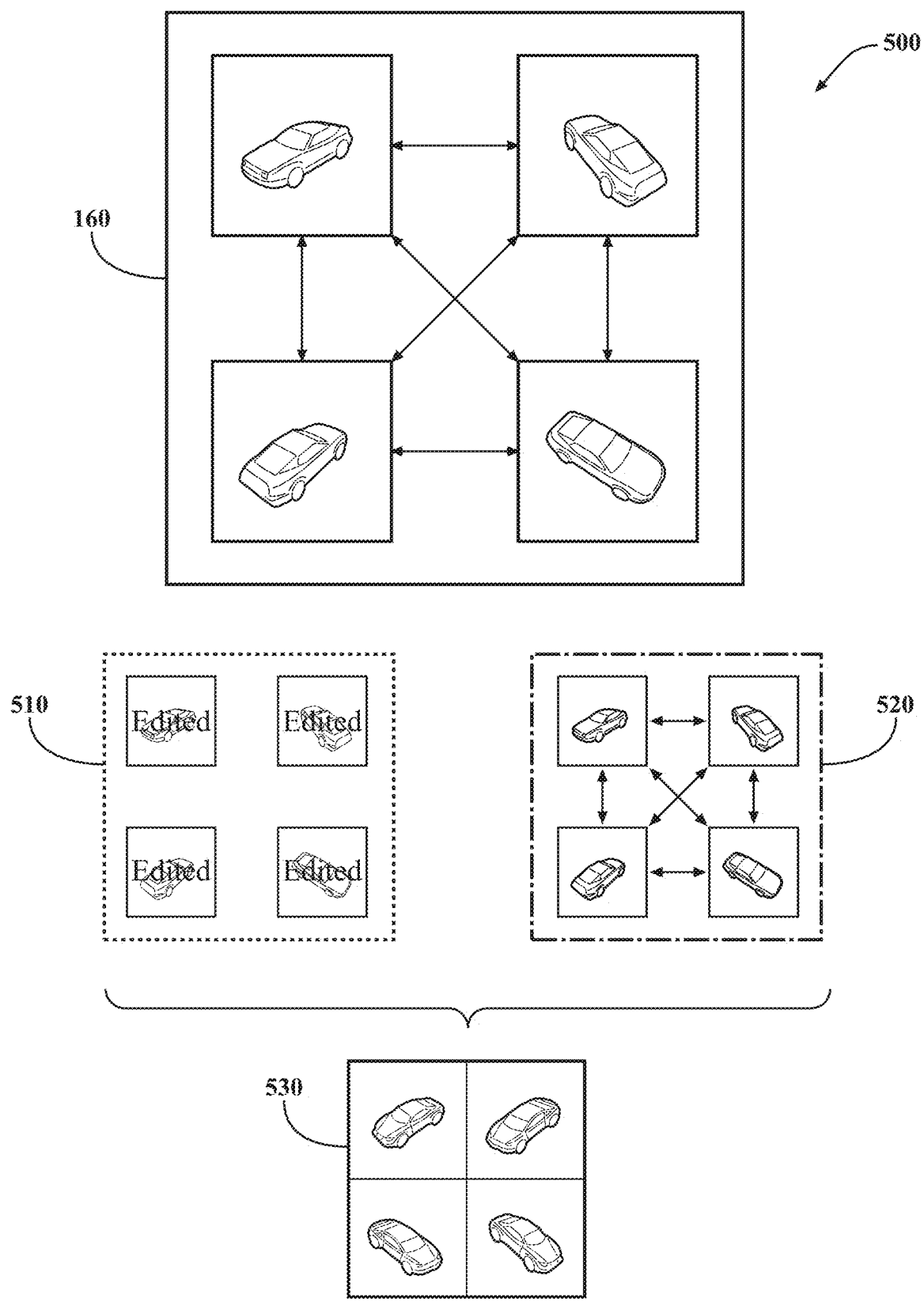
FIG. 5 illustrates one example of applying a diffusion model to propagate changes between 2D images of an object.

FIG. 5 illustrates one example of how the modeling system 100 propagates changes between a set of 2D images. In particular, the input, as shown in FIG. 5, are the object images 160. The modeling system 100 then edits the object images, as shown in 510. In this example, the modeling system 100 applies a generative model from the models 170 that edits each of the separate object images 160. However, the edits to the object images 160 are not consistent. That is, the edits may be to different parts of the vehicle or may be intended to be the same in the different views but include some variations. Thus, the modeling system 100 provides the images 510 to the diffusion model, as shown at 520, to enforce consistency between the images. The modeling system 100 executes the diffusion model over the images iteratively until the consistency value calculated between the images at each iteration satisfies the consistency threshold, at which point final images 530 are provided as an output.

Figure 6:
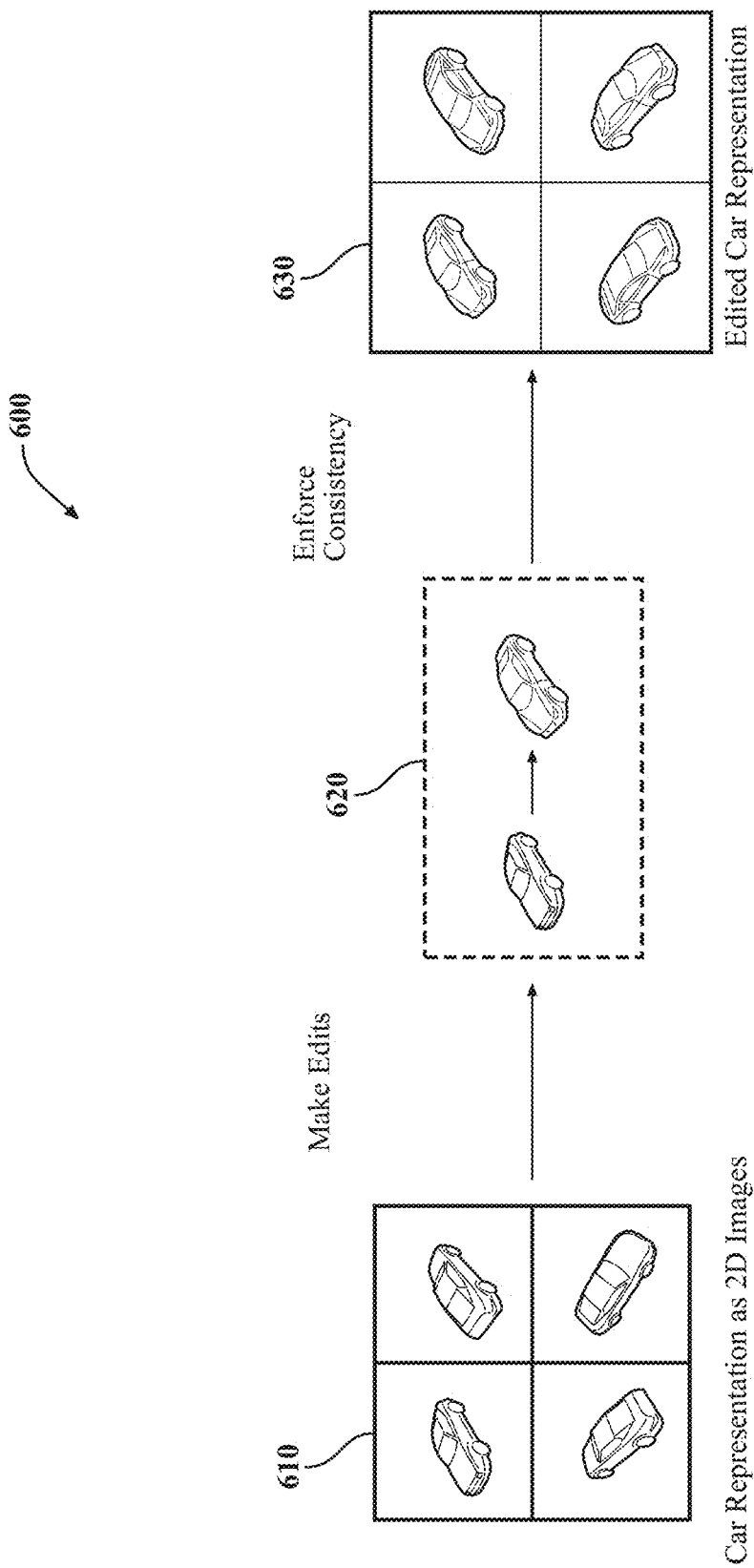
FIG. 6 illustrates another example of propagating changes between images.

FIG. 6 illustrates a further example 600 of how the modeling system 100 enforces consistency between a set of 2D images. As shown with the example 600, the modeling system 100 acquires the images 610 representing separate 2D views of a vehicle and edits one of the images at 620. Subsequently, the modeling system 100 applies the diffusion model to enforce consistency between the images 610 according to the edited image from 620. After propagating the changes over multiple iterations, the changes are represented in all of the images, as shown at 630. In this way, the modeling system 100 is able to propagate changes between 2D images when no explicit relationship is defined between the files.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, an electronic, magnetic, optical, electromagnetic, infrared, or semiconductor system, apparatus, or device, or a combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A modeling system, comprising:
   one or more processors;
   a memory communicably coupled to the one or more processors and storing instructions that, when executed by the one or more processors, cause the one or more processors to:
   acquire object images depicting an object;
   responsive to altering one of the object images into an edited image, adapt the object images to reflect changes in the edited image by iteratively applying a diffusion model to the object images until satisfying a consistency threshold, including propagating the changes from the edited image to the object images; and
   provide the object images to represent an edited version of the object.

2. The modeling system of claim 1, wherein the instructions include instructions to iteratively apply the diffusion model including instructions to compute a consistency value between the object images at each iteration and comparing the consistency value to the consistency threshold.

3. The modeling system of claim 2, wherein the instructions include instructions to compute the consistency value including instructions to apply a loss function between pairs of the object images to enforce consistency between the object images and extrapolate changes of the edited image to other images in the object images.

4. The modeling system of claim 1, wherein the instructions include instructions to train the diffusion model by denoising images of a set of objects that include a Gaussian distribution of noise according to a loss function that enforces consistency between separate views of an image.

5. The modeling system of claim 1, wherein the instructions include instructions to alter one of the object images into the edited image by altering a form of the object as depicted in the edited image using image editing or a generative model.

6. The modeling system of claim 1, wherein the object images depict different viewpoints of the object and the diffusion model propagates the changes from the edited image to other images of the object images, and wherein the diffusion model is generative neural network.

7. The modeling system of claim 1, wherein the instructions include instructions to provide the object images including instructions to convert the object images into a three-dimensional model that is a neural radiance field (NeRF).

8. The modeling system of claim 7, wherein the edited image is edited to improve drag of the object.

9. A non-transitory computer-readable medium including instructions that, when executed by one or more processors, cause the one or more processors to:
   acquire object images depicting an object;
   responsive to altering one of the object images into an edited image, adapt the object images to reflect changes in the edited image by iteratively applying a diffusion model to the object images until satisfying a consistency threshold, including propagating the changes from the edited image to the object images; and provide the object images to represent an edited version of the object.

10. The non-transitory computer-readable medium of claim 9, wherein the instructions include instructions to iteratively apply the diffusion model including instructions to compute a consistency value between the object images at each iteration and comparing the consistency value to the consistency threshold.

11. The non-transitory computer-readable medium of claim 10, wherein the instructions include instructions to compute the consistency value including instructions to apply a loss function between pairs of the object images to enforce consistency between the object images and extrapolate changes of the edited image to other images in the object images.

12. The non-transitory computer-readable medium of claim 9, wherein the instructions include instructions to train the diffusion model by denoising images of a set of objects that include a Gaussian distribution of noise according to a loss function that enforces consistency between separate views of an image.

13. The non-transitory computer-readable medium of claim 9, wherein the instructions include instructions to alter one of the object images into the edited image by altering a form of the object as depicted in the edited image using image editing or a generative model.

14. A method, comprising:
acquiring object images depicting an object;
responsive to altering one of the object images into an edited image, adapting the object images to reflect changes in the edited image by iteratively applying a diffusion model to the object images until satisfying a consistency threshold, including propagating the changes from the edited image to the object images; and
providing the object images to represent an edited version of the object.

15. The method of claim 14, wherein iteratively applying the diffusion model includes computing a consistency value between the object images at each iteration and comparing the consistency value to the consistency threshold, and
wherein propagating the changes includes using the diffusion model to incrementally alter the object images to be consistent with the edited image.

16. The method of claim 15, wherein computing the consistency value includes applying a loss function between pairs of the object images to enforce consistency between the object images and extrapolate changes of the edited image to other images in the object images.

17. The method of claim 14, further comprising:
training the diffusion model by denoising images of a set of objects that include a Gaussian distribution of noise according to a loss function that enforces consistency between separate views of an image.

18. The method of claim 14, wherein altering one of the object images into the edited image includes altering a form of the object as depicted in the edited image using image editing or a generative model.

19. The method of claim 14, wherein the object images depict different viewpoints of the object and the diffusion model propagates the changes from the edited image to other images of the object images, and wherein the diffusion model is generative neural network.

20. The method of claim 14, wherein providing the object images includes converting the object images into a three-dimensional model that is a neural radiance field (NeRF).

* * * * *